Dec. 30, 1969 A. F. McLEAN 3,486,329
CONTROL SYSTEM FOR GAS TURBINE/TRANSMISSION POWER TRAIN
Filed Nov. 24, 1967
FIG.1
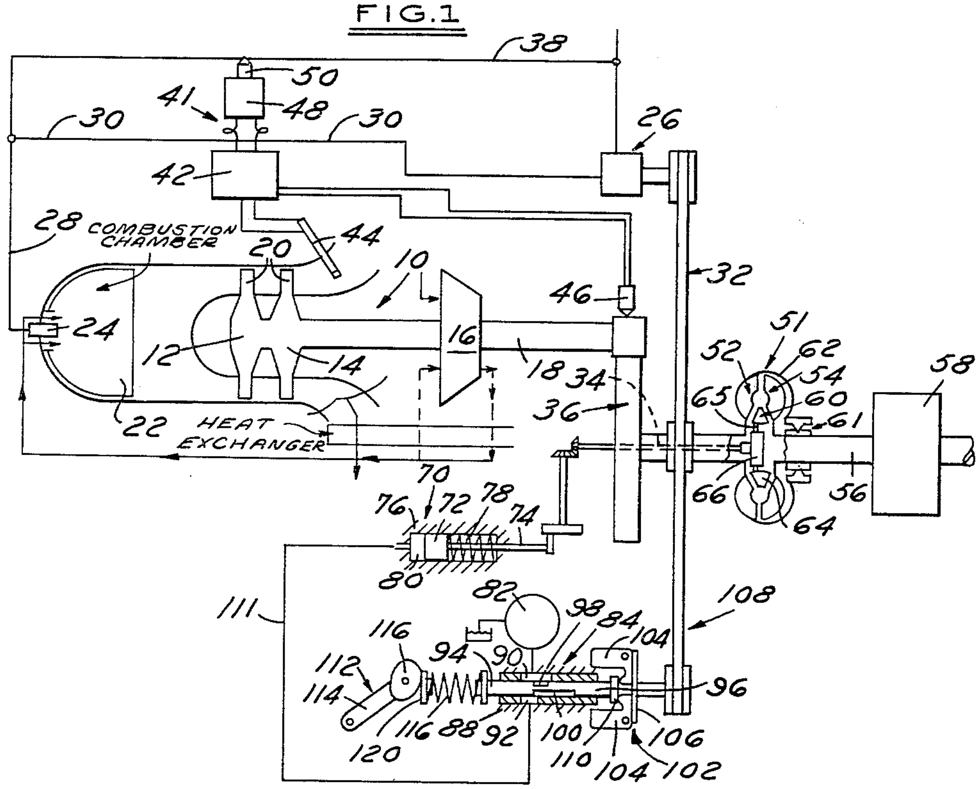
FIG.4
FIG.2
FIG.3
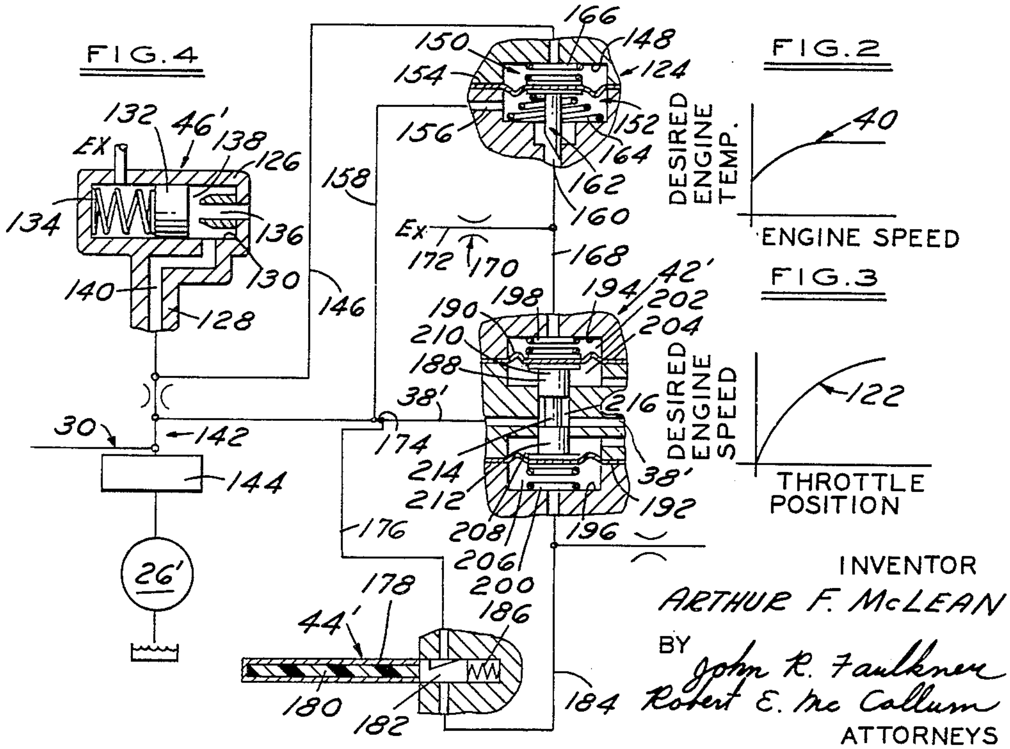
INVENTOR
ARTHUR F. McLEAN
BY John R. Faulkner
Robert E. Mc Callum
ATTORNEYS United States Patent Office 3,486,329
Patented Dec. 30, 1969

1

3,486,329

CONTROL SYSTEM FOR GAS TURBINE/ TRANSMISSION POWER TRAIN

Arthur F. McLean, Livonia, Mich., assignor to Ford Motor Company, Dearborn, Mich., a corporation of Delaware Filed Nov. 24, 1967, Ser. No. 685,563
Int. Cl. F02c *9/04, 9/02;* F16d *31/06*
U.S. Cl. 60—39.28 2 Claims

ABSTRACT OF THE DISCLOSURE

A fluid pressure regulating mechanism controls the angle of the stator blades of a hydraulic torque converter attached to the output shaft of a uni-shaft gas turbine engine to load or unload the engine shaft as a function of variations from desired engine speed; and a second control regulates fuel flow to the engine combustion chamber as a function of the error between actual turbine temperature and that temperature desired for the particular speed at which the engine shaft is running, to maintain a desired engine operating temperature.

This invention relates, in general, to a motor vehicle type gas turbine engine. More particularly, it relates to a control system for a motor vehicle power train that includes a gas turbine engine.

Uni-shaft gas turbine engines, in which the compressor and turbine members are mounted on a common power output shaft, are known. It is also known to control the operation of an engine of this type by the inclusion of a hydraulic torque converter with a controllable variable angle stator between the engine power output shaft and the vehicle transmission, such as, for example, is shown and described in U.S. 3,314,432 and U.S. 3,138,923. In the latter prior art, the torque converter stator angle is varied to load or unload the gas turbine output shaft to obtain desired operation of the engine.

The use of a uni-shaft type of gas turbine engine is desirable because of its simplicity and lower cost as compared to automotive type gas turbine engines using a separate gasifier section and a free rotating power turbine driving a power output shaft. In the latter case, variable power turbine nozzles generally are required to control the engine speed, and these nozzles are generally located in the hot section of the engine. This necessitates the use of exotic metals that can withstand the high temperatures, which is costly. Furthermore, since there usually is no direct connection between the compressor and power turbines, other provisions must be made for obtaining engine braking.

The invention relates to a control sytem for a uni-shaft gas turbine engine that has a variable angle stator torque converter mounted on the power output shaft, the control system automatically controling the angle of the stator to maintain the speed of the engine output shaft at the level chosen by the operator, the control system also automatically varying the engine fuel supply to maintain the correct turbine operating temperature at all times.

One of the objects of the invention, therefore, is to provide a gas turbine engine control system of the type described that automatically varies the angle of the reaction member of the torque converter as a function of changes in speed of the engine output shaft from the desired level to load or unload the output shaft in a manner to restore the output shaft to the chosen speed level.

It is also an object of the invention to provide a gas turbine engine control system in which the fuel flow to the engine combustion chamber is automatically varied as as a function of the changes in the engine temperature

2 from a scheduled or predetermined level so as to always maintain the operating temperatures at a maximum allowable value, or modified to avoid compressor surge.

It is a still further object of the invention to provide gas turbine engine control system of the type described in which the fuel flow to the combustion chamber is regulated as a function of the speed of the compressor or power output shaft, in a manner to maintain turbine operating temperature at the correct level for each speed level of the engine.

Other objects, features and advantages of the invention will become more apparent upon reference to the succeeding detailed description thereof, and to the drawings illustrating preferred embodiments thereof, wherein;

FIGURE 1 illustrates, schematically, a portion of a gas turbine engine driven motor vehicle power train embodying the invention;

FIGURES 2 and 3 illustrate graphically the desired engine temperature changes with changes in engine speed, and the desired engine speed changes with changes in throttle position, respectively; and, FIGURE 4 illustrates schematically a modified component of the control system illustrated in FIGURE 1.

FIGURE 1 illustrates schematically a portion 10 of a uni-shaft gas turbine engine. Basically, the engine includes a pair of turbine wheels 12 and 14 and a compressor member 16 all fixedly mounted on a common power output shaft 18. The compressor is shown as being the axial flow type; however, it will be clear that it could be of the centrifugal type without departing from the scope of the invention.

Turbine wheels 12 and 14 each include a plurality of circumferentially spaced blades 20 that project into the path of flow of and are rotated by the products of combustion from a combustion chamber 22. The combustion chamber includes the usual fuel nozzle 24 that receives a supply of fuel from a pump 26 through connecting lines 28 and 30. The fuel pump in this case is driven by a pulley and belt type drive 32 from the output shaft 34 of a reduction gear train 36 driven by the power output shaft 18.

Further details of construction and operation of the gas turbine engine per se, other than indicated schematically in FIGURE 1, are not given since they are known and believed to be unnecessary for an understanding of the invention. Suffice it to say, however, that the engine would include the usual diffuser section and heat exchangers common to an engine of this type for delivering the low temperature, high pressure compressor discharge air to the combustion chamber with a higher temperature, and for recapturing a portion of the waste heat of the exhaust gases to warm the compressor discharge air.

Fuel pump 26 has a capacity so as to always supply more fuel than is required by the system, so that the system is never starved. Accordingly, a fuel bypass line 38 is connected in parallel to supply line 28 so that some fuel is always bypassed back to the inlet of the fuel pump. In this case, as will be explained more fully later, the supply of fuel to fuel nozzle 24 is controlled so as to always maintain the turbine operating temperature at its maximum allowable value, as determined by the physical properties of the materials used in the engine, and controlled to avoid compressor surge at the particular speed at which the engine is operating. That is, with fixed area turbine exhaust nozzles, increases or decreases of the fuel supply to the combustion chamber with speed changes will change the operating temperature of the turbine section proportionally, according to a predetermined schedule.

More specifically, as is well known, there is a maximum temperature at which the turbine can be operated before damage to the parts occurs because of their physical property limits. There is also a temperature limit at each speed level to avoid compressor surge. Therefore, it is necessary to vary the turbine operating temperature as a function of compressor speed, and, since fuel flow varies turbine temperature, to vary fuel flow so that the turbine operating temperature will be at the correct level for any particular engine speed. Thus, the schedule of the change in desired engine temperature with changes in engine speed will vary, for example, in the manner of the curve 40 in FIGURE 2.

The invention accomplishes the above objectives by including a temperature-speed error comparator 41 that is sensitive to the error between actual turbine temperature and desired turbine temperature as called for by the particular speed of operation of the compressor or power output shaft. In this case, the control 41 includes electronic amplifier 42 that receives electrical impulses both from a temperature probe 44 located in the turbine section, and from a speed sensor 46 driven by the power output shaft, as shown. Probe 44 would sense actual turbine operating temperature, and sensor 46 actual speed. Amplifier 42 initially would be adjusted to a zero setting so as to produce no electrical output signal if, for example, the actual turbine outlet temperature is the same as that called for in FIGURE 2 by the particular speed of operation of the power output shaft.

More specifically, if the actual engine operating temperature falls on curve 40 in FIGURE 2 for the particular speed at which shaft 18 is rotating, then comparator 42 will sense no error between desired and actual engine turbine operating temperatures. If, however, the actual engine temperature as sensed by probe 44 is above or below the desired engine temperature for the particular speed level of shaft 18, as sensed by pickup 46, then comparator 42 will sense the difference and provide an output electrical signal that will vary in strength with the error magnitude. This output signal is then fed to an actuator 48 that controls the movement of a flow restricting valve 50 to control bypass of fuel through line 38 back to fuel pump 26.

In this case, actuator valve 48 can consist simply of a needle type valve cooperating with the fuel line to progressively block or unblock the line and thereby control the flow back to the fuel pump. If, as stated above, error is sensed by amplifier 42, the change in bypass flow of fuel will continuously change the fuel flow to nozzle 24 until the actual turbine operating temperature agrees with the desired engine temperature.

Returning now to the power plant, power train in FIGURE 1, reduction gear train shaft 34, in this case, serves as the power input to a hydraulic torque converter 51. The converter includes a pump or impeller member 52 secured for rotation with shaft 34, a turbine member 54 secured for rotation with the input member 56 of the vehicle gear box or transmission 58, and a variable angle stator or reaction member 60. The converter assembly also includes a one-way or overrunning clutch 61 of a known construction between the pump shell 62 and the turbine shaft 56. The clutch would include the usual sprags or rollers, and permit free rotation of pump 52 faster than turbine 54 in one direction, while locking up the pump and turbine at any attempt of the turbine to rotate faster than pump 52. This provides an engine braking effect to retard coasting of the vehicle in which the powerplant is installed.

Stator 60, in this case, has an annular set of reaction blades 64 that are pivotally mounted by means of crank pins 65 on an annular hub 66. The hub is held against rotation by being connected, in any suitable manner, not shown, to a stationary portion of the vehicle, but is adjustably movable circumferentially to adjust the angle or attitude of the stator blades in either direction from a neutral position aligned with the path of flow of fluid between the pump and turbine members.

More specifically, the torque converter operates in a known manner by the circulation of fluid in a torodial path from the pump to the turbine and back again through the reaction member. The reaction member serves to impart torque to the pump in a forward or reverse direction, depending upon the attitude of the stator blades, to the pump to thereby impart positive or negative torque on it. Thus, a load either will be imposed on or taken off the pump member and shaft 34. This, of course, is transmitted through reduction gearing 36 to shaft 18 to thereby load or unload the engine as a function of the position of the torque converter stator blades.

The circumferential movement of stator hub 66 to change the angle of the blades 64 is controlled by a fluid pressure operated servo 70. The servo includes a piston 72 having a rod 74 geared to hub 66, as shown, the piston being reciprocably mounted in a valve body 76. A spring 78 biases the piston in one direction, the piston being movable in the opposite direction by fluid under pressure admitted to a chamber 80 from a source of fluid under pressure, such as a pump 82.

Since the compressor speed controls the fuel flow and the turbine temperature, through control 41, it is desirable that once it is chosen to operate at a particular speed level, compressor speed then should be maintained essentially at that level. This is so the turbine theoretically will always operate at its maximum allowable temperature and yet avoid compressor surge, in the manner previously described. Therefore, in this case, the angle of the stator blades 64 is automatically varied as a function of the changes in compressor speed from each chosen level to automatically load or unload the engine output shaft 18 to thereby set the speed of the engine at the level called for. To accomplish this, the supply of fluid under pressure to piston chamber 80 is controlled by a pressure regulating type valve 84. Valve 84 is slidably mounted in a valve body 88 having varying width fluid pressure inlet and outlet ports 90 and 92. The valve has one end land 94 and a stepped diameter land 96 at the other end providing neck portions 98 and 100 of reduced diameter. The neck portions variably communicate fluid between the inlet and outlet ports as a function of the movement of the valve. The valve is moved in one direction to increase flow to servo 70 by a mechanical flyweight type governor 102. It consists of a pair of flyweights 104 pivotally mounted to a base plate 106 that is rotated by a belt connection 108 at the speed of shaft 34. The inner end portions of weights 104 abut against an enlarged end 110 of valve 84.

It will be clear that if shaft 18 is rotating at a particular speed, flyweights 104 will be in a position to move spool valve 84 to a predetermined position permitting a predetermined flow to the piston chamber 80 through line 111. This in turn will move the stator vanes or blades 64 to a predetermined attitude imposing a scheduled load on engine output shaft 18.

The movement of spool valve 84 by governor 102 is opposed by a vehicle operator control 112, which, in this case, is a variably movable engine throttle lever or accelerator pedal 114 to which is attached a cam 116. The cam bears against a spring 118 seated against the end 120 of spool valve 84. The cam shape and spring force will be chosen to provide a predetermined force for each degree of movement of throttle pedal 114.

In operation, at engine idle, throttle lever 114 and cam 116 will bear against spring 118 to exert a predetermined force on the spool valve 84. The position of the throttle valve, of course, demands a certain compressor speed at each arcuate setting, such as the schedule illustrated by the curve 122 in FIGURE 3. Accordingly, at the idle speed position of the throttle lever, the compressor should be rotating at a particular speed level. Therefore, the differential force acting on the spool valve 84 due to the depression of the accelerator pedal and the opposing force exerted by the flyweight governor resulting from the speed of the compressor will move the valve to regulate the fluid pressure force to servo piston 72. Initially this will position the stator blades 64 at an angle imposing a load on compressor shaft 18 such that it will rotate at a particular speed. If the speed varies from the schedule in FIGURE 3 for the particular position of throttle lever 114, than the slower or faster rotation of the compressor will cause a greater or less force to be exerted by the flyweight governor 102 and an increase or decrease in the fluid pressure supply to the piston 72. This will reposition the stator blades 64 to a further torque position loading or unloading shaft 34 and thereby engine shaft 18 to thereby increase or decrease the compressor speed to the scheduled level. Accordingly, it will be seen that any variances in speed from the desired compressor speed, as dictated by the position of lever 114, will cause the regulator valve to move accordingly to return the compressor speed to the desired level.

As an example, when an increase in speed is called for by depression of the throttle lever 114, the greater force exerted against the spool valve 84 will decrease the fluid pressure to the stator blade servo 70, and change the angle of the stator blades to unload the torque convertor pump and permit a speed up of engine shaft 18 to the desired level. This, of course, increases the speed of the fuel pump 26 and delivers a greater flow of fuel to the fuel nozzle 24 to increase the speed of the turbines and compressor. If the turbine outlet temperature is correct for the compressor speed sensed, then no error will be sensed by amplifier 41, and bypass fuel flow rate through line 38 will remain on schedule. If, however, the actual turbine temperature as sensed by probe 44 should be higher or lower than that called for by the particular speed of operation of the compressor, as sensed by speed pickup 46, then a difference between the two will cause the comparator 42 to send a signal to the actuator 48. This will cause valve 50 to open or close down, as the case may be, bypass line 38 so that less or more fuel is fed to fuel nozzle 24 to thereby decrease or increase the actual turbine temperature to the desired value.

It will be seen, therefore, that the control system provides a closed loop control in which compressor speed is controlled by the angular position of the torque converter stator blades, and that the fuel flow controls the actual turbine temperature.

FIGURE 1 utilizes an electronic control of the fuel flow in response to changes in turbine temperature and compressor speed. FIGURE 2 illustrates, schematically, a fluid control for the bypass of fuel back to the inlet of the fuel pump.

More specifically, the control in FIGURE 4 includes a fluid pressure speed signal generator 46'; a set temperature pressure generator 124; a bimetal turbine inlet temperature sensitive probe 44'; and a comparator 42' that compares actual turbine inlet temperature to the desired or set temperature generator signal to automatically provide the scheduled bypass fuel flow in line 38'.

More particularly, the speed signal generator 46' consists of a laterally offset cylindrical end housing 126 that is attached to a rotatable shaft 128 operatively driven by compressor shaft 18 in FIGURE 1. The bore of housing 126 constitutes a chamber 130 that slidably contains a fuel metering piston 132 of predetermined mass. The piston is biased by a spring 134 against the port end of a cylindrical vent passage 136 fixed to the housing and leading to the fuel sump, not shown. The space between the port, the end of piston 132 and the walls of housing 126 defines an annular fluid pressure chamber 138 that is connected through a central bore 140 in shaft 128, and an orifice 142 to a pressure regulator 144 and fuel pump 26'.

In operation, the mass of piston 132 and the force of spring 134 will be chosen so that at zero or some predetermined speed of shaft 128, piston 132 initially will be seated against the end of passage 136 to block the drain of fuel from bore to the sump. As the speed signal generator rotates, the force of the spring 134 and centrifugal force acting on piston mass 132 will maintain passage 136 closed until the back pressure buildup in chamber 138 has risen to a point just above these forces. Passage 136 will then be cracked open and begin to bleed fuel to the sump. For any given speed, therefore, piston 132 will oscillate back and forth until an equilibrium position is obtained where the fluid pressure forces exactly balance the centrifugal and spring forces, thereby providing a predetermined level to the pressure in line 140. Accordingly, as the speed of shaft 128 changes, the fluid pressure level will also change, to follow a parabolic curve pattern, in a known manner.

The back pressure in chamber 138 and passage 140 is reflected through a line 146 to the desired or set temperature generator 124. It includes a fluid pressure chamber 148 that is divided into two portions 150 and 152 by a flexible annular diaphragm 154. Upper chamber 150 is directly connected to speed signal generator line 146. The lower chamber 152 has an inlet 156 connected by a line 158 to the output of pressure regulator 144 at a location upstream of orifice 142. The orifice isolates the output pressure of regulator 144 from the influence of the speed signal generator in a known manner.

The set temperature generator chamber 124 also has a variable area outlet opening 160, the area of which is controlled by a movable needle valve 162 secured to diaphragm 154. The diaphragm is biased upwardly by a spring 164 against the force of a centering spring 166 so as initially to provide a predetermined size opening to outlet 160 providing a predetermined pressure drop of the fluid from line 158 into a desired or set pressure line 168. In effect, therefore, needle valve 162 constitutes a pressure regulating valve variably controlling the pressure in line 168 as a function of speed changes. Line 168 contains the usual orifice 170, the downstream portion 172 of which is vented to the fluid sump. Line 168 is connected to one side of comparator 42'.

Fluid pressure line 158 has a branch portion 174 that is further branched into a line 176 and fuel bypass line 38'. Line 176 directs a controlled pressure to the lower side of comparator 42' to provide a differential force on the comparator. This latter force controls the position of the comparator to regulate the flow of fuel through bypass line 38'.

More specifically, flow through line 176 is controlled by a bimetallic temperature sensing probe 44'. Probe 44', in this case, would project into the turbine section of the gas turbine engine so as to be sensitive to the temperature therein. As shown, the probe consists of an assembly of a fixed outer tubular housing 178 of, say, steel, for example, loosely enclosing a ceramic rod 180. The rod is secured to a tapered needlelike valve 182 that controls the flow of fuel and the pressure drop between line 176 and a line 184. Valve 182 and rod 180, in this instance, are biased to the left by a spring 186 to an initial set position providing a predetermined minimum flow or communication of fluid between lines 176 and 184, and acts as a pressure controlling valve.

In operation, valve 182 initially would be positioned to indicate a predetermined turbine gas inlet temperature. Variances above or below this temperature will expand or contract the steel housing axially faster than the ceramic rod, and permit spring 186 to move the rod to the left or the rod to be moved to the right against the spring, as the case may be, to allow less or more communication between lines 176 and 184.

Comparator 42' consists of a valve 188 that is secured at opposite ends to annular flexible diaphragms 190 and 192. The diaphragms are sealingly secured to the walls of chambers 194 and 196 formed in a valve body, and each biased towards the other by centering springs 198 and 200. The diaphragms subdivide the chambers 194 and 196 into further chambers 202, 204, 206, and 208, chambers 204 and 208 are being vented, as shown. Chamber 202 receives the fluid under pressure from the desired pressure line 168, while chamber 206 receives the pressure from line 184.

Valve 188 is of the spool type having a pair of lands 210 and 212 connected by a neck portion 214 of reduced diameter. The neck portion defines a fluid pressure annulus 216 that cooperates at all times with line 38' on both sides. In effect, the comparator 42' senses the desired or set pressure in line 168 and the sensed or actual temperature signal pressure in line 184, the differential between the two moving the valve up or down, as the case may be, to bypass less or more fuel from line 38' to the pump.

In operation, referring to FIGURE 4, for a given compressor speed, the pressure in line 146 acting on diaphragm 154 of the desired or set temperature pressure generator 124 will be at a scheduled value. The output pressure from regulator 144 at this time will be reflected in chamber 152 of the set temperature generator. The difference between the two pressures will position the needle valve 162 to provide a scheduled pressure in line 160, the desired pressure for this particular compressor speed. This, of course, is reflected against diaphragm 190 of comparator 42'.

At the same time, the output pressure of regulator 144 is bled through the actual temperature probe controlled valve 182 to the sensed temperature pressure line 184 to provide a predetermined pressure in chamber 206 of comparator 42'. The difference between the pressure in comparator chambers 202 and 206 will position spool valve 188 upward or downward, as the case may be, to open or close down bypass line 38'. Therefore, if the gas turbine inlet temperature sensed by probe 44' is correct for the particular speed at which the compressor is rotating, then the amount of bypass in line 38' will be such as to maintain the fuel flow at this level. This will maintain the desired turbine temperature.

Assume now that probe 44' indicates that the turbine inlet temperature is lower or higher than that permissible for this particular compressor speed, to avoid compressor surge, or to avoid an over temperature condition of the engine. The higher temperature will move the probe housing 178 to the left and permit a similar movement of rod 180 by spring 186. This moves valve 182 to decrease the fuel pressure level in line 184 and chamber 206 of comparator 42'. Since the desired set pressure signal in chamber 202 remains the same for this particular engine speed, the spool valve 188 will be moved downwardly by the higher pressure in chamber 202 and admit more fuel from line 38' past the valve to thereby decrease the fuel flow to line 28 in FIGURE 1. This lowers the turbine inlet gas temperature. Accordingly, this change will continue for so long as the turbine inlet temperature remains above the desired or critical value. If it should drop below the desired value, the opposite action, of course, will occur. That is, the desired or set pressure then will be lower than the pressure in line 184 (the sensed temperature pressure) and less fuel will be bypassed. More fuel will be fed to the engine nozzle 24 resulting in a higher gas inlet temperature.

The above regulation of the bypass fuel will, therefore, vary until the turbine gas inlet temperature is correct or maximum for the particuar compressor speed in question, to avoid compressor surge while maintaining the temperature at its maximum allowable value.

I claim:

1. A control system for a motor vehicle type gas turbine powerplant that includes a single shaft gas turbine engine having a combustion chamber receiving fuel therein for combustion thereof, compressor and turbine members fixed on a common power output shaft and driven by the gas products of combustion from said chamber, a vehicle driveshaft, and a hydrodynamic torque converter operably conecting said shafts, said torque converter having a pump element connected to said output shaft, a turbine element connected to said driveshaft, and a variably movable reaction member between said elements movable to a plurality of positions to vary the torque multiplication through said converter and thereby vary the load reaction on said output from a minimum to a maximum, said control system including, a fluid pressure servo operably connected to said reaction member for moving it to its various positions, fluid pressure force means comprising a source of fluid under pressure, conduit means connecting said fluid to said servo to act thereon for moving the same, and control means controlling the intensity of said force means, said control means including a fluid pressure regulating valve in said conduit means variably movable therein between flow restricting and non-restricting positions controlling the flow of fluid therepast, output shaft driven speed responsive governor means connected to and acting on one end of said valve moving said valve in one direction to vary the intensity of said fluid pressure force means in response to changes in speed of said output shaft from a predetermined level, spring means having said valve in the opposite direction, and selectively operable operator movable torque demand means acting on the said opposite end of said valve in opposition to said speed responsive means for operably changing the position of said reaction member to vary the speed of said output shaft as a function of the movement of said operator movable means and the differential force acting on said valve.

2. A control system as in claim 1, including turbine gas temperature sensing means adjacent said turbine member, a fuel pump driven by said output shaft, conduit means connecting the fuel from said pump to said combustion chamber, said conduit means including a fuel bypass line returning the fuel from said conduit means to said pump, and movable control means in said bypass line having means controlling the return flow of fuel to said pump as a function of the differential between sensed turbine gas temperature and desired gas temperature, the latter temperature varying as a function of the speed of said common shaft, common shaft driven speed sensing means, and means connecting said temperature and speed sensing means to said control means, said control means including a comparator acted upon differentially by said temperature and speed sensing means and actuated by a differential therebetween to vary the flow of fuel through said bypass line.

References Cited

UNITED STATES PATENTS

| | | | |
|---|---|---|---|
| 2,162,543 | 6/1939 | Banner | 60—54 |
| 2,623,354 | 12/1952 | Best. | |
| 2,932,940 | 4/1960 | Edsall et al. | 60—54 XR |
| 2,977,756 | 4/1961 | Stone | 60—39.28 |
| 3,138,923 | 6/1964 | Kronogard | 60—39.16 XR |

AL LAWRENCE SMITH, Primary Examiner

U.S. Cl. X.R.

60—39.24, 54